United States Patent
DeJohn

(10) Patent No.: US 7,486,040 B2
(45) Date of Patent: Feb. 3, 2009

(54) CIRCUIT TO MOMENTARILY INCREASE THE PEAK TORQUE OF A DC MOTOR

(75) Inventor: Charles R. DeJohn, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 174 days.

(21) Appl. No.: 11/507,760

(22) Filed: Aug. 22, 2006

(65) Prior Publication Data

US 2008/0048600 A1 Feb. 28, 2008

(51) Int. Cl.
*H02P 7/00* (2006.01)

(52) U.S. Cl. ............... 318/434; 318/432; 323/220; 323/242; 323/246

(58) Field of Classification Search ........... 318/432, 318/434; 323/220–354
See application file for complete search history.

(56) References Cited

U.S. PATENT DOCUMENTS

| | | | | |
|---|---|---|---|---|
| 3,761,792 A | * | 9/1973 | Whitney et al. ............. | 318/788 |
| 3,926,264 A | * | 12/1975 | Bardwell et al. ............ | 173/182 |
| 5,844,343 A | * | 12/1998 | Horst ......................... | 310/184 |
| 6,166,500 A | * | 12/2000 | Makaran .................. | 318/400.22 |
| 6,239,610 B1 | * | 5/2001 | Knecht et al. .............. | 324/772 |
| 6,566,839 B2 | * | 5/2003 | DaSilva et al. ............. | 318/703 |
| 6,867,561 B1 | * | 3/2005 | Pollock et al. ........... | 318/400.2 |

* cited by examiner

*Primary Examiner*—Rita Leykin
(74) *Attorney, Agent, or Firm*—Paul L. Marshall

(57) ABSTRACT

A motor control circuit for supplying power to a DC motor which drives a mechanism having a driven shaft, the control circuit having a parallel combination of a capacitor and switch in series with the DC motor. When the movement of the driven shaft is obstructed, the motor driver and the switch are synchronized in a manner to first charge the capacitor and then to reverse the voltage generated by the motor driver to momentarily double the voltage applied to the DC motor so that the increased torque of the DC motor is able to overcome the obstruction. The mechanism having a shaft driven by the DC motor may be, for example, an ETC valve or a window regulator.

10 Claims, 3 Drawing Sheets

CIRCUIT TO MOMENTARILY INCREASE THE PEAK TORQUE OF A DC MOTOR

TECHNICAL FIELD

The present invention relates to a circuit for controlling the operation of a DC motor; more particularly, to a circuit that momentarily increases the peak torque of the DC motor; and most particularly, to a circuit that can increase peak motor torque to overcome a resistance imposed on the DC motor.

BACKGROUND OF THE INVENTION

The use of DC motors to drive mechanisms is well known. For example, in an automotive application, DC motors are used to drive power window regulators or electronic throttle control (ETC) valves. It is also well known that, during the expected operation of motors in these applications, the motors can be required to overcome resistance imposed on the motors by the mechanisms themselves. Examples are resistance imposed on a window regulator motor by the compression of a window seal or resistance imposed on an ETC valve motor by the formation of ice around the throttle valve. With respect to an ETC valve, in extreme cold weather, during engine operation, ice can form in the air conduit upstream of the throttle valve. Then, when the engine is shut-down, engine heat can melt the ice allowing water to accumulate and freeze around the throttle valve. The formed ice can inhibit the throttle valve from being easily moved from the position it was left in at engine shut-down. Since a motor is used to control the rotational movement of the valve in an ETC system, the need to break the valve loose from an occasional ice obstruction as described puts added torque requirements on the motors used to drive the ETC valves.

As a result, current designs of ETC valves use larger motors than needed to rotate the valve under most conditions in order to be capable of generating the high torque needed for ice breaking. During normal operation, high motor torque is not required. Large motors compared to small motors have many disadvantages including higher costs, increased weight, and difficulties in packaging in the ETC.

It is an object of the present invention to provide a method and circuit used in conjunction with an electric motor that could provide a momentary increase in peak torque of the motor to overcome a resistance imposed on the motor.

SUMMARY OF THE INVENTION

Briefly described, a DC motor control circuit includes a bipolar motor driver which has a first terminal thereof coupled to a first terminal of the motor, a parallel combination of a capacitor and a switch with a first terminal of the parallel combination coupled directly to a second terminal of the bipolar voltage source and a second terminal of the parallel combination coupled to a second terminal of the motor. A motor monitor is coupled to the motor, the switch, and the bipolar voltage source, the motor monitor sensing when the motor lacks sufficient torque to rotate a driven shaft under operating conditions and controls the operation of the switch and the bipolar voltage source to momentarily increase the torque of the bipolar motor.

Also briefly described is a method for momentarily increasing the torque on a DC motor by placing a capacitor in series with the motor, charging the capacitor to a first voltage of a motor driver coupled to the motor and the capacitor, and changing the first voltage to a second voltage, the first and second voltages being of opposite polarity.

BRIEF DESCRIPTION OF THE DRAWINGS

These and other features and advantages of the invention will be more fully understood and appreciated from the following description of certain exemplary embodiments of the invention taken together with the accompanying drawings, in which.

Corresponding reference characters indicate corresponding parts throughout the several views. The exemplification set out herein illustrates a currently-preferred embodiment of the invention, and such exemplification is not to be construed as limiting the scope of the invention in any manner.

DESCRIPTION OF THE PREFERRED EMBODIMENTS

Figure 1:
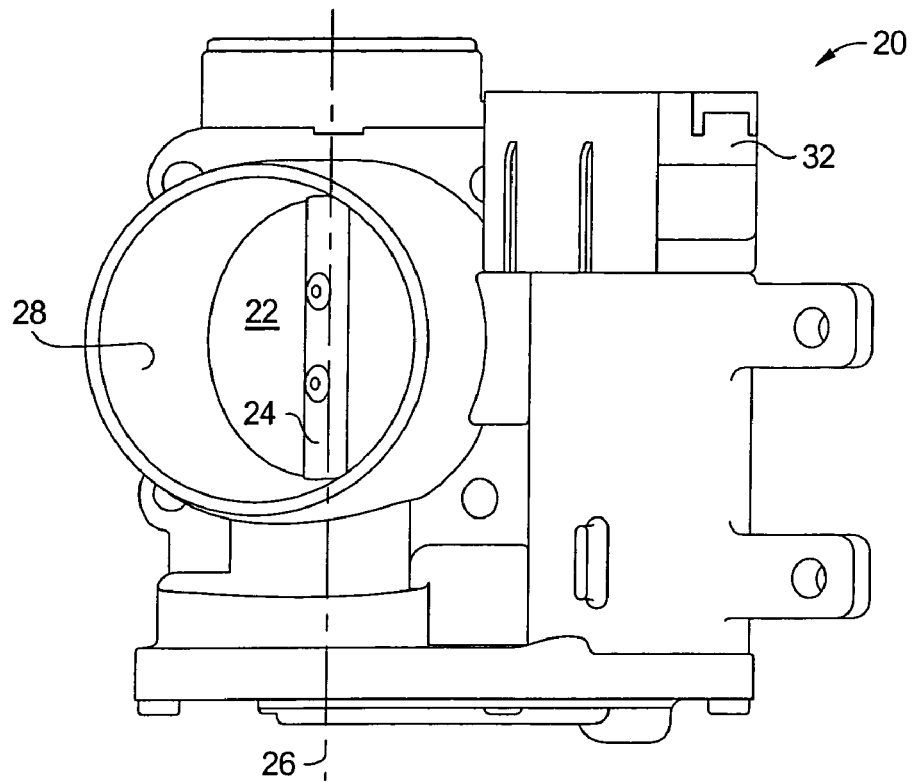
FIG. 1 is a perspective view of an exemplary ETC valve.

Referring to FIG. 1, a perspective view of an ETC valve 20 is shown which is of a type that can be used in conjunction with the present invention. The ETC valve 20 includes a butterfly valve 22 mounted on driven shaft 24 for rotation about shaft axis 26 in throttle bore 28. Rotational movement of driven shaft 24 is controlled by motor 32 through motor output shaft (not shown) typically through a transmission as known in the art. The novelty and advantages conferred by the invention may be better appreciated by first considering a prior art motor control circuit used in conjunction with an ETC valve.

Figure 2:
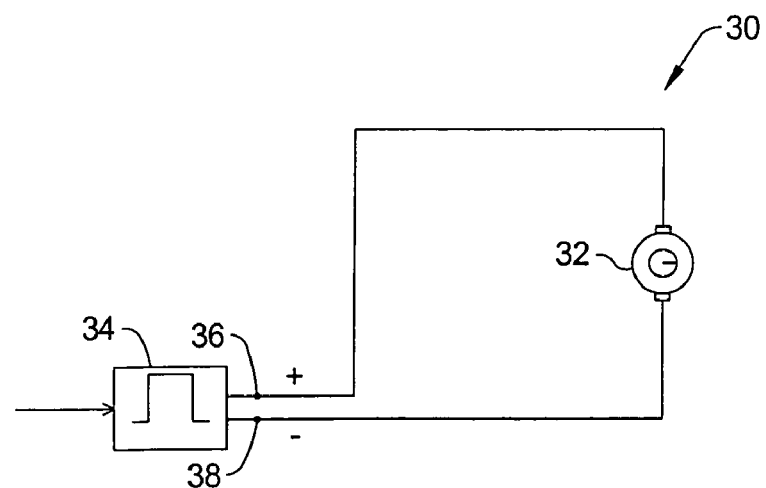
FIG. 2 is a schematic diagram of a prior art circuit for controlling the operation of a component such as an ETC valve.

Referring first to FIG. 2, a prior art motor control circuit 30 comprises DC motor 32 driven by a motor driver 34 which supplies plus 12 volts to minus 12 volts at the motor driver 34 output terminals 36 and 38 using variable duty cycles to control the driven shaft position.

Figure 3:
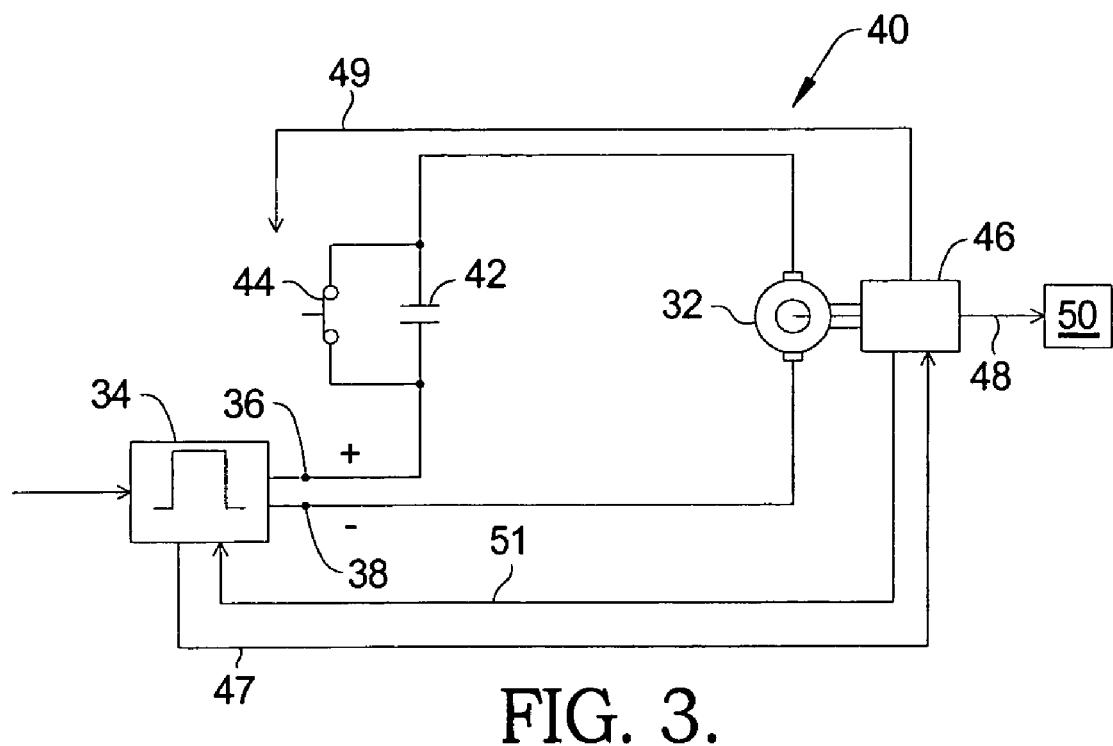
FIG. 3 is a schematic diagram of a circuit for controlling the operation of a component such as an ETC valve according to an embodiment of the present invention in a first state.

Referring to FIG. 3, a motor control circuit 40 according to an embodiment of the present invention includes a capacitor 42 in parallel with a switch 44 which has been placed in series with the DC motor 32. During normal operation as shown in FIG. 3, wherein the driven shaft 24 is not impeded from rotation such as by icing, the switch 44 is closed so that the capacitor 42 is bypassed and has no effect on the normal operation of the motor 32. Also shown in FIG. 3 is a motor monitor 46 that measures the voltages at the terminals of motor 32, and the current through the motor 32. In the example shown, an impediment or obstacle may cause butterfly valve 22 to stick and keep the output shaft of motor 32 from rotating normally, and since the current through the motor is greater than when the driven shaft 24 is turning without obstruction, this increase in current is detected by the motor monitor 46. The motor monitor 46 also receives the voltage on terminal 36 from the motor driver 34, controls the switch 44, and during the freeing of resistance posed by the driven shaft the butterfly valve 22 from the obstruction, controls the motor driver 34.

When the motor monitor 46 detects that the operation of the ETC valve 22 is impeded (i.e., an abnormal obstruction exists), the following events occur to prepare the ETC motor control circuit 40 to free the ETC valve 22:

1) Motor monitor 46 sends signal 48 to fuel injector control circuit 50 to momentarily shut off the fuel supply to the engine.

2) Motor monitor 46 sends signal 51 to driver 34 to rotate the motor shaft in a first rotational direction against a mechanical stop imposed on driven shaft 24 by applying a minus 12 volts to motor 32 (terminal 36 at 0 volts and terminal 38 at +12 volts).

3) Since motor 32 can act as an inductor, ground at least one of terminals 36 or 38 of the bipolar voltage source while either open-circuit or ground the other of terminals 36 or 38 to allow any inductive current from the motor coils to dissipate before it has a chance to charge capacitor 42.

4) Motor monitor 46 sends signal 49 to switch 44 causing switch 44 to open.

Figure 4:
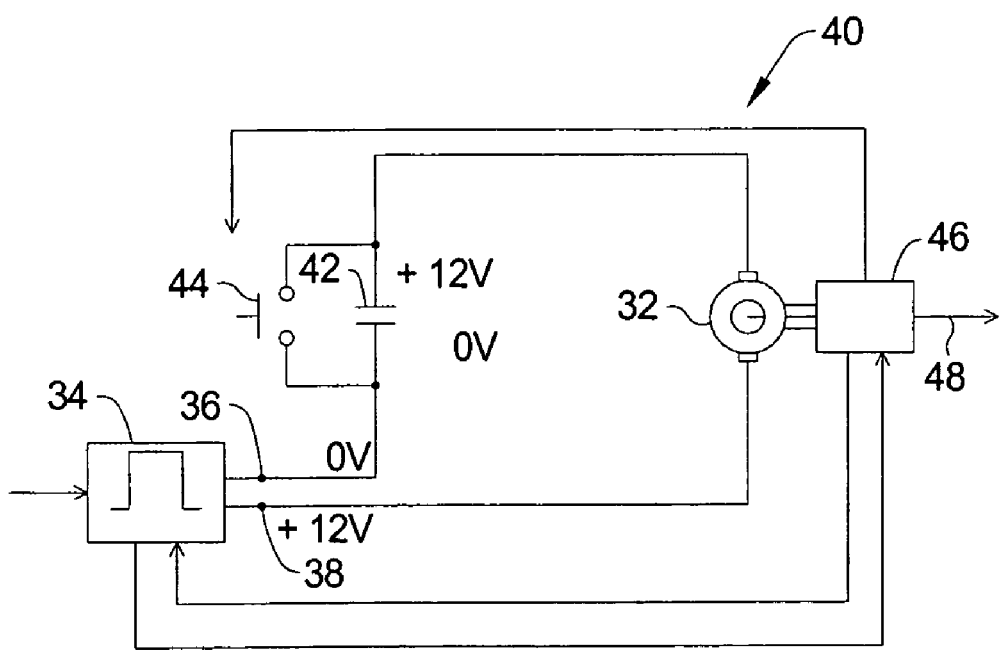
FIG. 4 is a schematic diagram of the circuit of FIG. 3 in a second state.

5) The motor driver 34 applies minus 12 volts at 100% duty cycle (terminal 36 at 0 volts and terminal 38 at +12 volts) as shown in FIG. 4.

Figure 5:
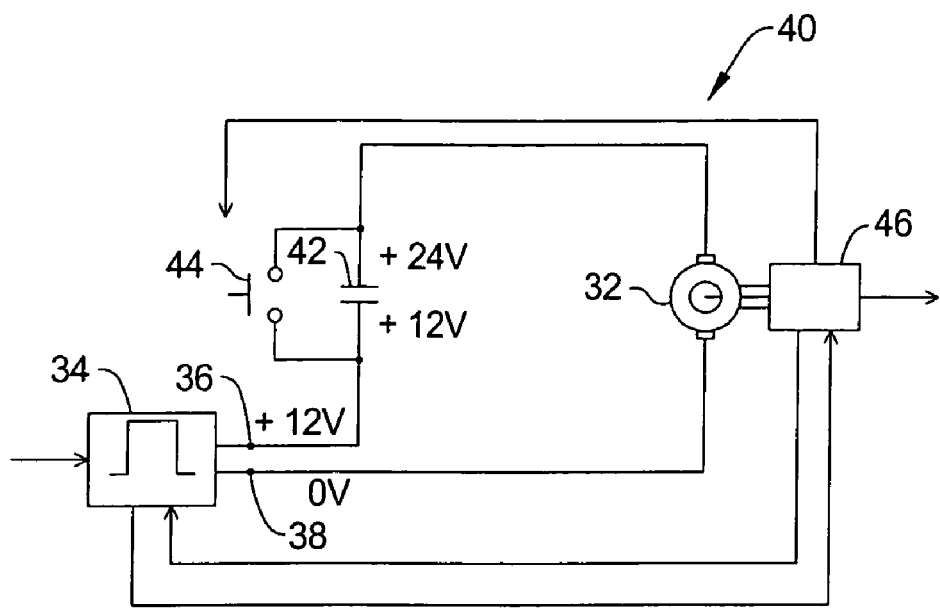
FIG. 5 is a schematic diagram of the circuit of FIG. 3 in a third state.

After the capacitor 42 is fully charged such that there is a 12 volt potential across the plates of the capacitor 42, as shown in FIG. 4, the motor driver 34 is switched from minus 12 volts to plus 12 volts (terminal 36 at 12 volts and terminal 38 at 0 volts). At the time that the motor driver 34 switches polarity, a plus 24 volts is applied to motor 32 as shown in FIG. 5 causing the output shaft of motor 32 to rotate in a second rotational direction. Since the torque of a DC motor is linearly related to the voltage applied to the motor, the normal torque of motor 32 will be initially doubled to provide enough torque to overcome the resistance posed by the driven shaft upon the output shaft of the motor, and the driven shaft will break free of the obstruction in the opening direction.

Figure 6:
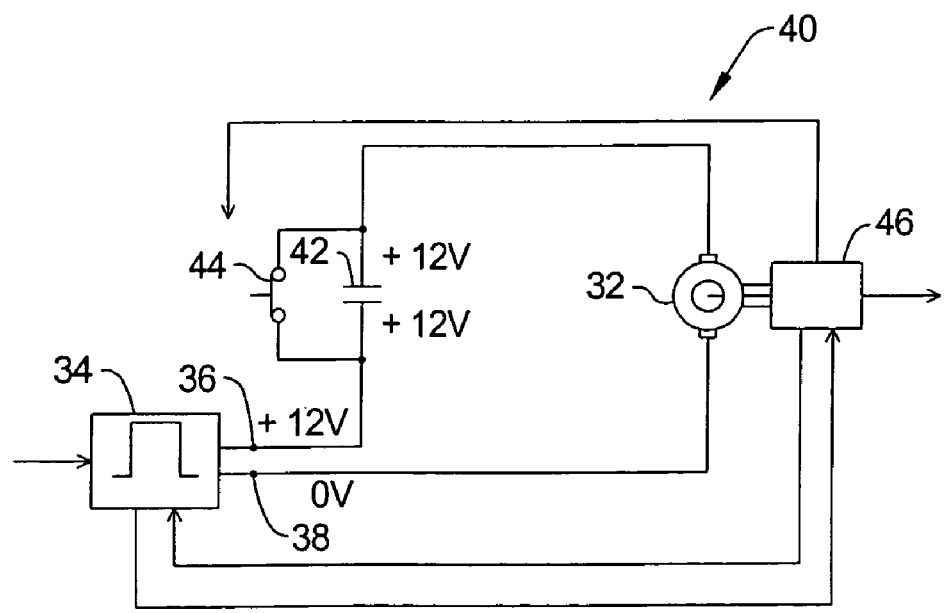
FIG. 6 is a schematic diagram of the circuit of FIG. 3 in a fourth state.

When the motor monitor 46 detects the unimpeded movement of the driven shaft, the motor control circuit 40 is reset to its normal operating state (i.e., switch 44 closed when the capacitor 42 is essentially discharged as shown in FIG. 6), the driven shaft is then returned to its starting position (and fuel is made available to the engine quickly via signal 48 from motor monitor 46 to enable the engine to operate normally. Before the switch 44 is closed, the motor driver 34 continues to provide plus 12 volts until the voltage across the capacitor 42 is 0 volts, determined by comparing the voltage at terminal 36, which is controlled by the motor driver 34, to the voltage at the terminal of the ETC motor 32 connected to the capacitor 42 that is detected by the motor monitor 46. After the switch 44 has been closed, the motor driver 34 reverses the polarity of the output voltage to minus 12 volts to return the driven shaft (and in the case of the ETC valve—the butterfly valve) to the closed or starting position. The total time for the motor control circuit 40 to return to normal operation after the detection of the impediment would be determined in great part by the time constant of the resistive-capacitive network created by motor 32, driver circuit 34 and capacitor 42. Therefore, the selection of the capacitance value for capacitor 42 can allow for the tailoring of this time constant and the selection of a desired recovery time within which the motor control circuit 40 would return to normal operation.

While a bipolar voltage source is shown herein for simplicity, it should be apparent to those skilled in the art that a bi-polar current source could be used with appropriate resistors placed in parallel with the capacitor to allow the capacitor to charge.

While the embodiment described herein in step 5 set the duty cycle to 100% to allow the capacitor to charge to 12 volts in the quickest possible fashion, it is understood that a lesser duty cycle could be used to charge the capacitor to 12 volts over a longer period of time. Or, a lesser-duty cycle for the same period of time could be used to provide a smaller charge on the capacitor. This smaller charge could still provide enough additional voltage to boost the DC motor past a lesser impediment. A lesser duty cycle if a greater one was not needed would be useful in protecting the insulated windings of the motor from overheating by limiting the applied voltage (and therefore the current) running through the motor.

While an ETC valve is used as an example of a mechanism driven by a DC motor having a control circuit in accordance with the invention, it is understood that the control circuit claimed can be used in conjunction with any DC motor where a momentary increase in peak torque is desirable.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A DC motor control circuit comprising:
   a) a bipolar motor driver having a first terminal thereof coupled to a first terminal of said motor;
   b) a parallel combination of a capacitor and a switch with a first terminal of said parallel combination coupled directly to a second terminal of said bipolar motor driver and a second terminal of said parallel combination coupled directly to a second terminal of said DC motor; and
   c) a motor monitor coupled to said DC motor, said switch, and said bipolar motor driver, said motor monitor sensing when said DC motor lacks sufficient torque to rotate a motor shaft of said DC motor under normal operating conditions and controlling the operation of said switch and said bipolar motor driver to momentarily increase the torque of said bipolar motor.

2. The DC motor control circuit of claim 1, wherein the bipolar motor driver comprises a bipolar current source.

3. The DC motor control circuit of claim 1, wherein the bipolar motor driver comprises a bipolar voltage source.

4. A DC motor control circuit comprising:
   a) a bipolar motor driver having a first terminal thereof coupled to a first terminal of said motor;
   b) a parallel combination of a capacitor and a switch with a first terminal of said parallel combination coupled directly to a second terminal of said bipolar motor driver and a second terminal of said parallel combination coupled to a second terminal of said DC motor; and
   c) a motor monitor coupled to said DC motor, said switch, and said bipolar motor driver, said motor monitor sensing when said DC motor lacks sufficient torque to rotate a motor shaft of said DC motor under normal operating conditions and controlling the operation of said switch and said bipolar motor driver to momentarily increase the torque of said bipolar motor;
   wherein torque is increased by charging said capacitor with said motor driver to a first voltage using a first motor driver polarity and then switching the motor driver to a second voltage having a second motor driver polarity opposite the first motor driver polarity in series with the capacitor and the DC motor such that the second voltage is increased by the voltage arising from the charge on the capacitor to thereby apply a resultant voltage across the DC motor that is greater than the second voltage.

5. A method for momentarily increasing the torque on a motor comprising the steps of:

a) placing a capacitor in series with said DC motor;

b) charging said capacitor to a first voltage of a motor driver coupled to said DC motor and said capacitor; and c) changing said first voltage to a second voltage, said first and second voltages being of opposite polarity.

6. A method for freeing a driven shaft encumbered by an obstacle comprising the steps of:

a) placing a capacitor in series with an DC motor having an output shaft that drives said driven shaft;

c) charging said capacitor by applying a first voltage to said series combination of said capacitor and said DC motor until a voltage across said capacitor is equal to said first voltage;

d) applying a second voltage to said series combination of said capacitor and said DC motor, said second voltage being of opposite polarity of said first voltage.

7. A method for freeing a driven shaft is accordance with claim 6 further including the step of placing a short across the terminals of said capacitor after said driven shaft is no longer encumbered by said obstacle.

8. A method for freeing a driven shaft is accordance with claim 7 wherein the voltage across said capacitor is below a predetermined voltage before said terminals are shorted together.

9. A method for freeing a driven shaft in accordance with claim 6 wherein said capacitor is added in step a) when a current through said DC motor is below a predetermined current.

10. A method for freeing a driven shaft in accordance with claim 6 wherein said capacitor is added in step a) by opening a switch that is across the terminals of said capacitor.

\* \* \* \* \*